UNITED STATES PATENT OFFICE.

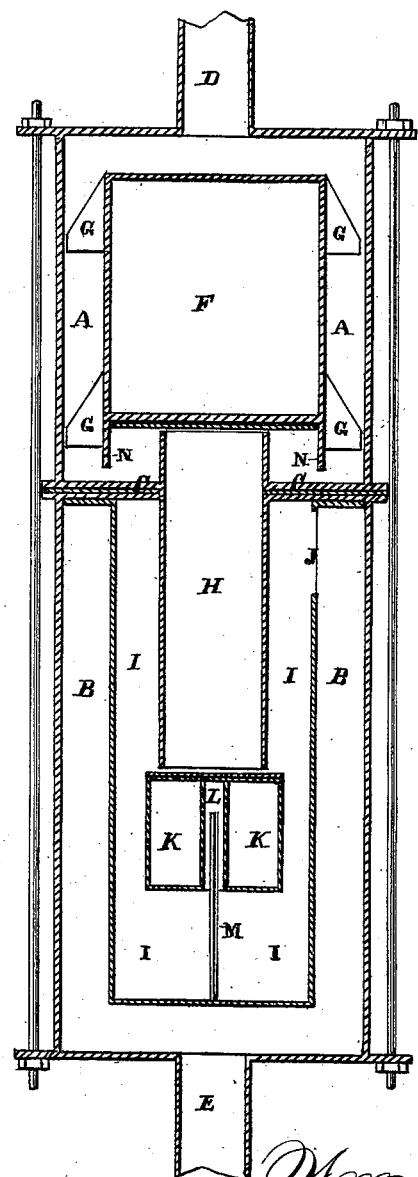

WILLIAM E. WORTH, OF SAN FRANCISCO, CALIFORNIA.

IMPROVEMENT IN STENCH OR BASIN TRAP VALVES.

Specification forming part of Letters Patent No. 207,472, dated August 27, 1878; application filed July 8, 1878.

*To all whom it may concern:*

Be it known that I, WILLIAM ELLISON WORTH, of the city and county of San Francisco, and State of California, have invented an Improved Stench or Basin Trap Valve; and I do hereby declare the following to be a full, clear, and exact description thereof, reference being had to the accompanying drawings.

My invention relates to an improved stench or basin trap valve, for the prevention of the admission of sewer-gas into dwellings through the pipes connecting the basins with the sewers.

It consists in forming two chambers in a cylindrical case, and connecting the two chambers by means of a pipe, through which water may flow. A float-valve is arranged to close the opening at the upper end of this pipe when the water is out of the upper part of the chamber, while the pipe is opened by the valve while water is flowing. The pipe connecting the chambers extends down into a cylinder in the lower chamber, and a float-valve in this cylinder allows the water to flow down the pipe, but, as soon as the flow ceases, floats up against the lower end of the pipe and closes it tightly. The water which enters the cylinder flows out of a passage at its top, and thence into the chamber, and out of the waste-pipe. Sewer-gas is prevented from passing into the basin through this trap by its peculiar construction and operation, and the liability to siphonage is entirely overcome.

Referring to the accompanying drawings, a cylindrical case or chamber is divided into two compartments, A and B, by means of a diaphragm or horizontal partition, C. The discharge-pipe from the basin, sink, or other receptacle enters the chamber A at the point represented at D, and the outlet or discharge pipe E for the valve is attached to the central lower portion of the chamber B, as shown.

The cylindrical case or chamber containing the operating parts, and forming a portion of my improved valve, is placed in a vertical position under the basin, sink, or other receptacle, so that the waste-pipe to the sewers is attached above and below it, as herein described.

In the upper compartment or chamber, A, is placed a cylindrical float-valve, F, having peculiarly-shaped beveled lugs or guides G on the outer sides, at both upper and lower ends, which impinge upon the inner sides of the casing of the compartment or chamber in which the valve floats, so as to keep said valve in a central and vertical position as it is moved up or down in said cylinder by the action of the water. These lugs or guides are beveled or inclined downward, as shown, so that in case pins, hair, paper, or other substances enter the chamber, they will pass by the lugs or guides without catching, and will not clog the float, so as to prevent its free action.

The lugs or guides keep the float in a central position at all times, so as to leave a free passage for the water through the chamber A, between the inner sides of the casing, and around the float. The sides of this float are extended downward at N, so as to extend down past the upward-projecting end of the pipe H, hereinafter described, and form a water-trap at that point.

A pipe, H, passes vertically through the center of the horizontal diaphragm, separating the two chambers A and B, its upper end projecting a short distance above said diaphragm, into the compartment or chamber A, and its lower end extending downward into a cylinder in the lower chamber, as hereinafter described.

The bottom of the float-valve F in the upper chamber is covered with leather or rubber to form a packing or gasket, so that when the lower end of the float comes down on top of the upper end of the pipe H a tight joint is formed, for the purpose of forming a seal to the upper end of said pipe.

To the under side of the diaphragm or partition C is secured a cylinder, I, with a closed bottom, which extends down nearly, but not quite, to the lower end of the lower compartment, B, as shown, space being left around said cylinder I, between it and the sides of the chamber B. At the upper end of this cylinder I, on one side, is cut a slot or water-passage, J, to admit of the water flowing into said cylinder passing out into the chamber B, and thence to the discharge-pipe E.

The pipe H, connecting the two chambers A and B, through the diaphragm, as herein described, projects down into the cylinder I for about half its length, and another float-valve, K, is arranged to close the lower end of said pipe. This valve K is made in a cylindrical form, and has a cylindrical tube, L, in its center, which is open at the lower, but closed at the upper, end. A guide stem or rod, M, secured to the center of the bottom of the cylinder I, projects up into the cylindrical tube L in the valve K, keeping said valve in a central vertical position, and preventing it from moving from side to side in the cylinder, while at the same time the valve is allowed a vertical motion, so as to float up or down in the water in the cylinder. The upper surface of this valve K is covered with leather, rubber, or similar substance, so as to make a tight joint when the valve is pressed up against the lower end of the pipe H.

The operation of my valve is as follows: Being attached to the waste-pipe of the basin or sink in the manner herein described, when the water in the basin is allowed to flow into the upper chamber, A, through the pipe D, it passes around the sides of the float-valve, and raises said valve from the top of the pipe H, thus leaving an opening through said pipe into the cylinder I in the lower chamber, B. As the water passes down said pipe H it presses the lower float-valve, K, away from the lower end of said pipe H, so that it passes out of the lower end of said pipe into the cylinder I, the pressure of water forcing the said valve away from the pipe as long as the flow continues. The water then continues to rise in the cylinder I, and passes out of its upper end through the slot or passage J, within the space between said cylinder and the sides of the shell or casing, whence it flows off through the discharge-pipe E in the bottom of the chamber B.

It will be seen from this construction and operation that a trap or seal is formed both ways by the double valves, and that it is impossible for the water in the cylinder I to be siphoned off. The pipe from the basin is perfectly straight, with no curves, crooks, or bends. When the flow from the basin is stopped the valve in the upper chamber gradually settles down as the water in said chamber passes into the pipe connecting the two compartments until said valve rests on top of the pipe and closes the aperture. As the upper end of this pipe is somewhat above the slot in the cylinder I, where the water passes into the lower chamber, the water in said pipe, in seeking its level, forms a partial vacuum under the upper valve and holds it to its seat on the pipe. As soon as the downward pressure exerted on the lower valve by the passage of the water through the pipe H is relieved, and the surplus water overflows from the cylinder I through the slot or water-passage J, the lower valve floats up against the lower end of the pipe H and closes the passage. The lower valve is then entirely immersed in water, the cylinder I being filled up to the edge of the escape-passage J.

Now any foul air or gas from the sewer which may enter the lower chamber, B, through the pipe E will naturally rise to the top of said chamber, but can get no farther through the trap, since in order to get into the room through the basin it would have to pass down through the water in the cylinder I, and then up through the pipe H, which is impossible for it to do. Moreover, the greater the pressure of said gas or air on the water in the cylinder, the tighter will the lower valve press against the opening in the pipe leading to the upper compartment and the basin. Even when water is flowing through the trap, as herein described, it is impossible for bubbles of foul gas to rise, since to do so the air would have to pass downward through the body of water in the cylinder and up through the pipe, which it would be impossible for it to do; and even if great pressure were exerted by the gas, the lower float-valve would effectually close the passage.

The usual overflow-pipe from the basin may be led into the upper chamber of the trap, or into the main pipe above the upper chamber, so that no gas can get into the apartment by that means, as is the case where curved pipes simply are used for traps, and where the overflow-pipe is led into the waste-pipe below the curve to prevent siphoning.

In case any heavy substances, such as pins, &c., pass down into this trap, they will be caught in the cylinder I; but lighter substances will pass through. Should the cylinder at any time become clogged, the two chambers may be separated and the substances easily removed from the cylinder.

This trap will effectually prevent sewer-gases arising into dwellings through the basin, as a body of water remains at all times in the cylinder, and both ends of the pipe connecting the chambers are sealed by the valves at all times, except when water is flowing through the traps.

Having thus described my invention, what I claim as new, and desire to secure by Letters Patent, is—

1. The exterior double case A B, with its inlet-pipe D and exit-pipe E, in combination with the float-valve F, pipe H, and inclosing-chamber I, with its overflow-opening J, substantially as and for the purpose herein described.

2. The double-compartment chamber A B, with its connecting-pipe H extending into the upper chamber, and the chamber I, in combination with the float-valve F, said valve having an exterior annular flange, N, which acts with the pipe H as a trap, substantially as herein described.

3. The double-compartment chamber A B, with its connecting-pipe H extending into both chambers, in combination with the float and trap valve F and the lower float-valve, K, substantially as and for the purpose herein described.

4. In combination with the double-compartment chamber A B, with its inlet and outlet passages, as shown, the connecting-pipe H, and the float-valves F and K, the chamber I within the lower compartment, having the discharge-slot J at the top, substantially as and for the purpose herein described.

In witness whereof I hereunto set my hand and seal.

WILLIAM E. WORTH. [L. S.]

Witnesses:
 GEO. H. STRONG,
 FRANK A. BROOKS.